United States Patent
Vijayasankar et al.

(10) Patent No.: US 8,670,458 B2
(45) Date of Patent: Mar. 11, 2014

(54) SLOTTED CHANNEL ACCESS TECHNIQUES IN NETWORK COMMUNICATIONS

(75) Inventors: Kumaran Vijayasankar, Dallas, TX (US); Shu Du, San Jose, CA (US); Anand G. Dabak, Plano, TX (US); Badri N. Varadarajan, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 77 days.

(21) Appl. No.: 13/421,593

(22) Filed: Mar. 15, 2012

(65) Prior Publication Data

US 2012/0236875 A1    Sep. 20, 2012

Related U.S. Application Data

(60) Provisional application No. 61/453,003, filed on Mar. 15, 2011.

(51) Int. Cl.
*H04L 12/43* (2006.01)
*H04B 7/212* (2006.01)

(52) U.S. Cl.
USPC .......................... 370/458; 370/442

(58) Field of Classification Search
None
See application file for complete search history.

(56) References Cited

U.S. PATENT DOCUMENTS

| | | | | |
|---|---|---|---|---|
| 2007/0230497 A1* | 10/2007 | Choi et al. | | 370/442 |
| 2009/0067389 A1* | 3/2009 | Lee et al. | | 370/336 |
| 2009/0161622 A1* | 6/2009 | Sugaya | | 370/329 |

* cited by examiner

*Primary Examiner* — Clemence Han
(74) *Attorney, Agent, or Firm* — Steven A. Shaw; Wade James Brady, III; Frederick J. Telecky, Jr.

(57) ABSTRACT

Systems and methods for designing, using, and/or implementing slotted channel access techniques in network communications are described. In some embodiments, a method may include selecting one of a plurality of time slots within a contention access period (CAP), each of the plurality of time slots having a predetermined duration, and transmitting a packet during the selected time slot. For example, the time slot may be selected randomly or based on a round-robin algorithm. In some implementations, the duration of each of the plurality of time slots may correspond and/or be equal to: (a) a duration of a data packet of maximum size, (b) a sum of durations of a request-to-send packet, an interframe space, and a clear-to-send packet, and/or (c) a duration of a guaranteed time slot (GTS) or contention free period (CFP) request packet, as prescribed by a given communication protocol or standard.

23 Claims, 7 Drawing Sheets

SLOTTED CHANNEL ACCESS TECHNIQUES IN NETWORK COMMUNICATIONS

CROSS-REFERENCE TO RELATED APPLICATION

This application claims the benefit of the filing date of U.S. Provisional Patent Application No. 61/453,003 titled "Slotted channel access Procedure that Helps Avoid Hidden Node Collisions When Carrier Sensing is Not Possible" and filed Mar. 15, 2011, the disclosure of which is hereby incorporated by reference herein in its entirety.

TECHNICAL FIELD

This specification is directed, in general, to network communications, and, more specifically, to systems and methods for designing, using, and/or implementing slotted channel access techniques in network communications.

BACKGROUND

There are several different types of network communications available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for designing, using, and/or implementing slotted channel access techniques in network communications are described. In an illustrative, non-limiting embodiment, a communication device may select one of a plurality of time slots within a contention access period (CAP), each of the plurality of time slots having a predetermined duration. The communication device may then transmit a packet during the selected time slot. In some cases, selecting the one of a plurality of time slots may include randomly selecting a time slot. Alternatively, selecting the one of a plurality of time slots may include using a round-robin algorithm or the like.

In some implementations, the CAP may follow a superframe prescribed by a communication protocol or standard, and the predetermined duration may correspond to a maximum packet transmission time supported or prescribed by such communication protocol or standard. For instance, the packet may be a data packet.

Additionally or alternatively, the predetermined duration may correspond to the sum of durations of: a request-to-send packet, an interframe space, and a clear-to-send packet prescribed by the communication protocol or standard. In those cases, transmitting the packet may include transmitting a request-to-send packet to another communication device. Further, the communication device may receive a clear-to-send packet from the other communication device during the selected time slot, the clear-to-send packet indicating an assigned data packet transmission time, and it may then transmit a data packet to the other communication device for the assigned data packet transmission time. For example, the communication device may be a PLC device and the other communication device may be a PLC data concentrator.

Additionally or alternatively, the predetermined duration may correspond to a duration of a guaranteed time slot (GTS) or contention free period (CFP) request packet. In those cases, the communication device may transmit a GTS or CFP request packet to another communication device, receive a GTS or CFP assignment from the other communication device, and transmit a data packet to the other communication device during the GTS or CFP assignment.

In some embodiments, one or more communication devices or computer systems may perform one or more of the techniques described herein. In other embodiments, a tangible computer-readable or electronic storage medium may have program instructions stored thereon that, upon execution by one or more communication devices or computer systems, cause the one or more communication devices or computer systems to execute one or more operations disclosed herein. In yet other embodiments, a communication system (e.g., a modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
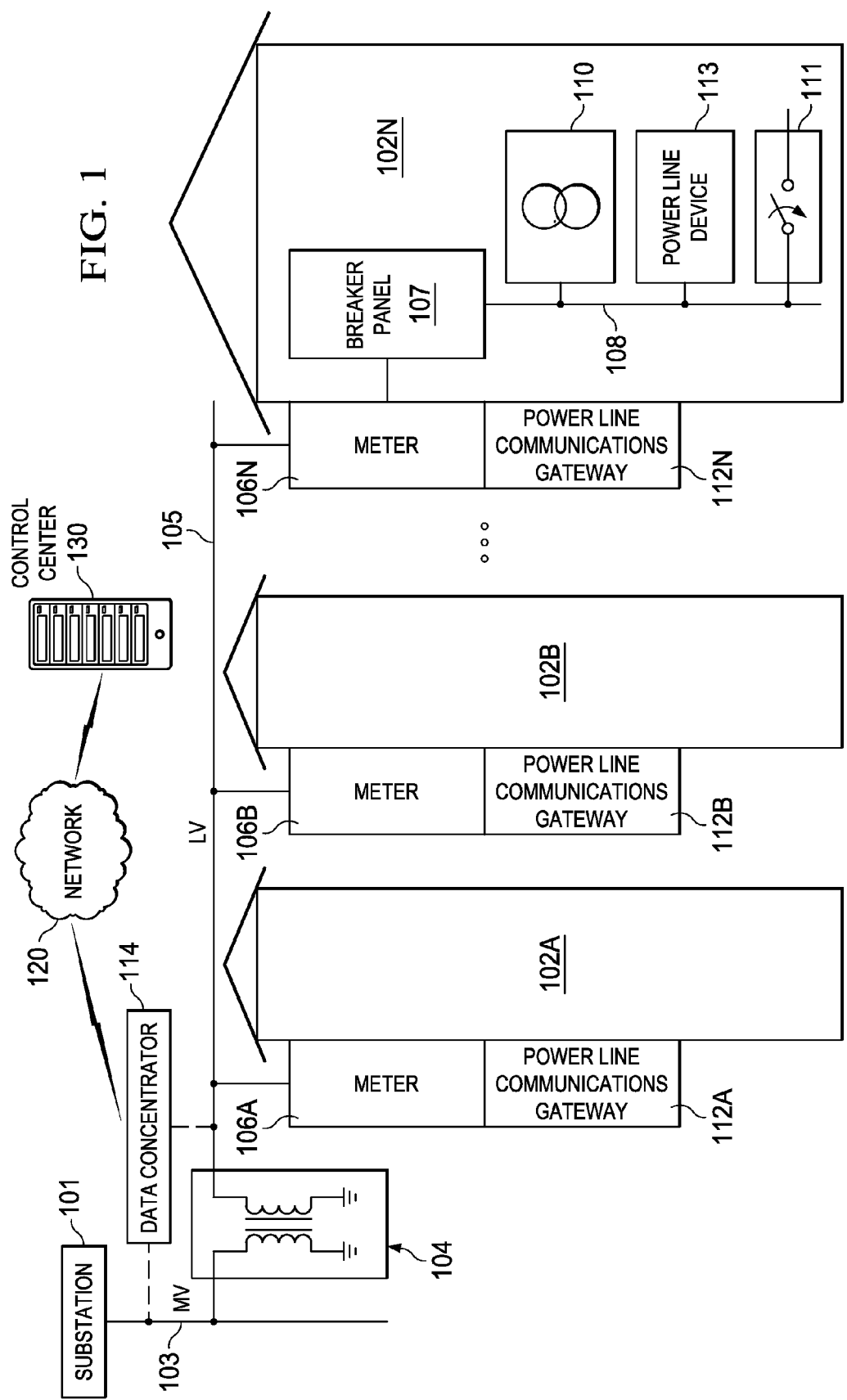

Having thus described the invention(s) in general terms, reference will now be made to the accompanying drawings, wherein:

FIG. 1 is a block diagram of a power line communication (PLC) environment according to some embodiments.

Figure 2:
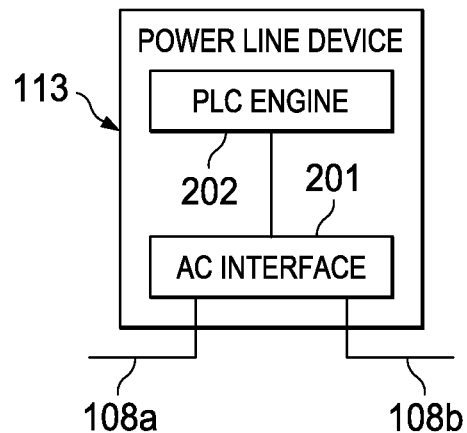

FIG. 2 is a block diagram of a PLC device or modem according to some embodiments.

Figure 3:
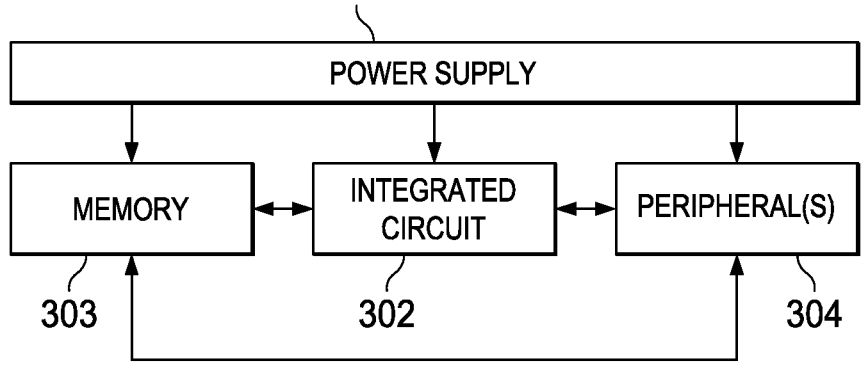

FIG. 3 is a block diagram of an integrated circuit according to some embodiments.

Figure 4:
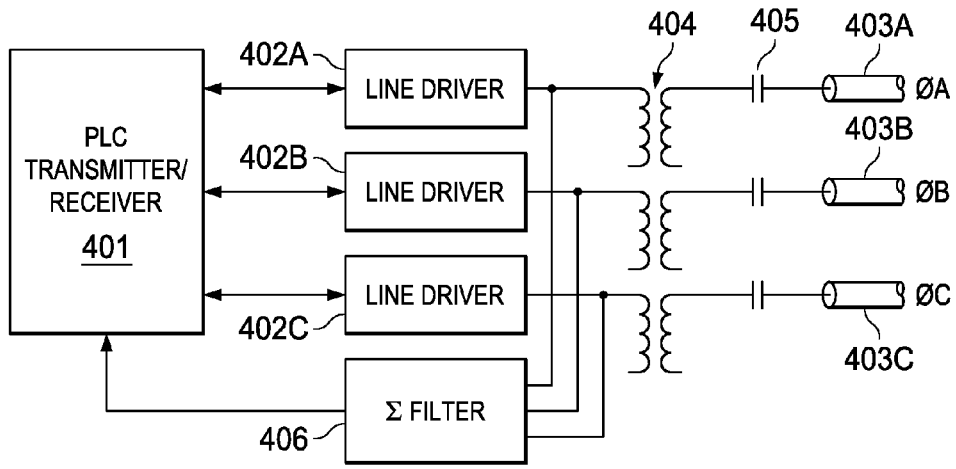
Figure 5:
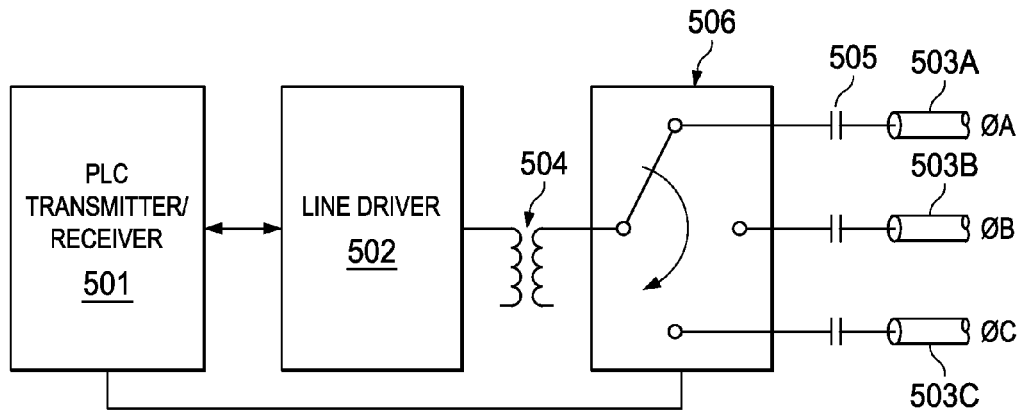
Figure 6:
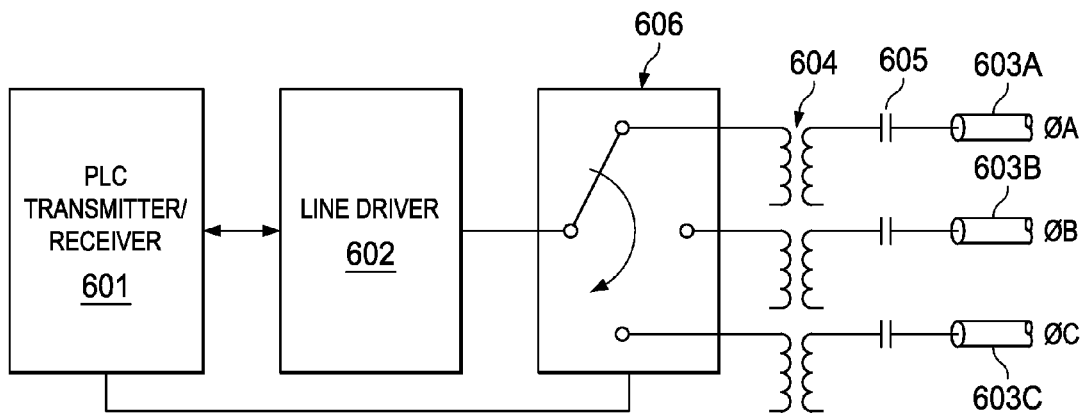

FIGS. 4-6 are block diagrams illustrating connections between a PLC transmitter and/or receiver circuitry to three-phase power lines according to some embodiments.

Figure 7:
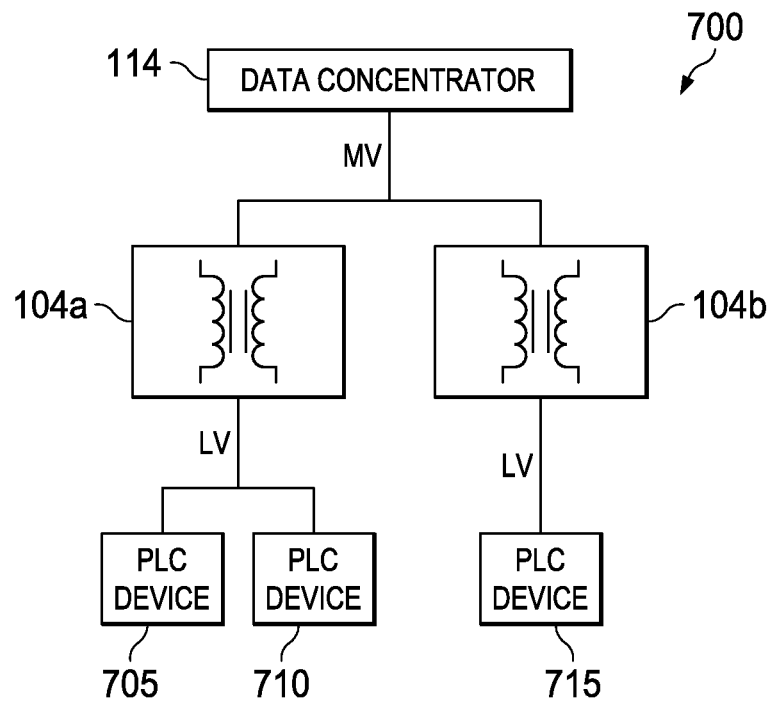

FIG. 7 is a block diagram of a simplified PLC network according to some embodiments.

Figure 8:
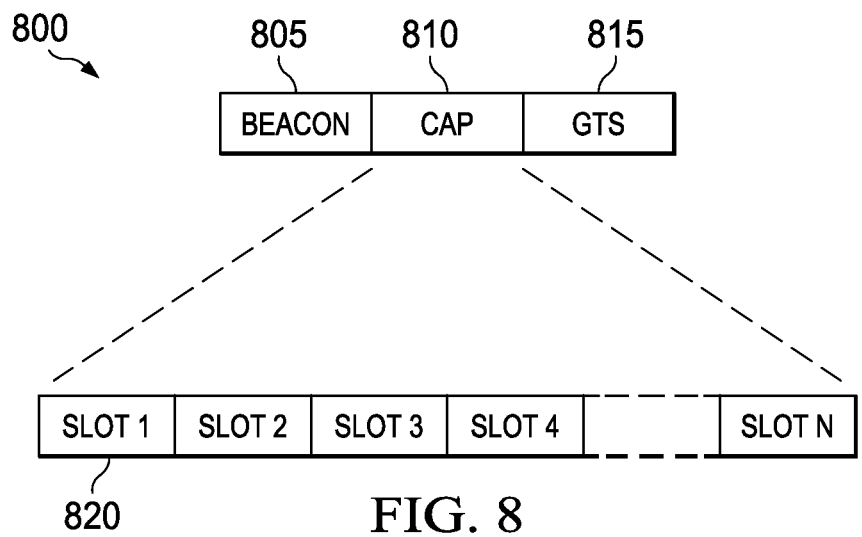

FIG. 8 is a block diagram of a superframe suitable for slotted channel access in PLC communications according to some embodiments.

Figure 9:
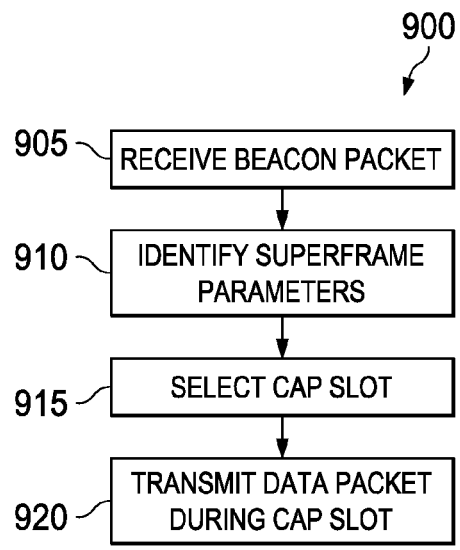

FIG. 9 is a flowchart of a first slotted channel access technique according to some embodiments.

Figure 10:
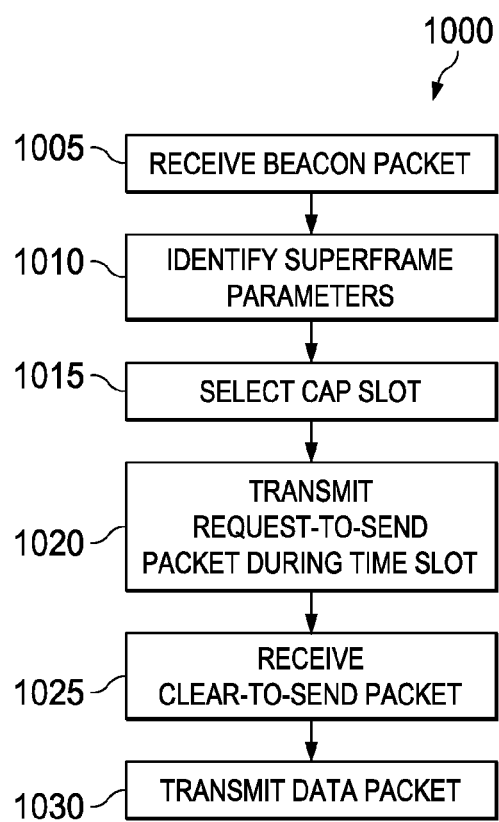

FIG. 10 is a flowchart of a second slotted channel access technique according to some embodiments.

Figure 11:
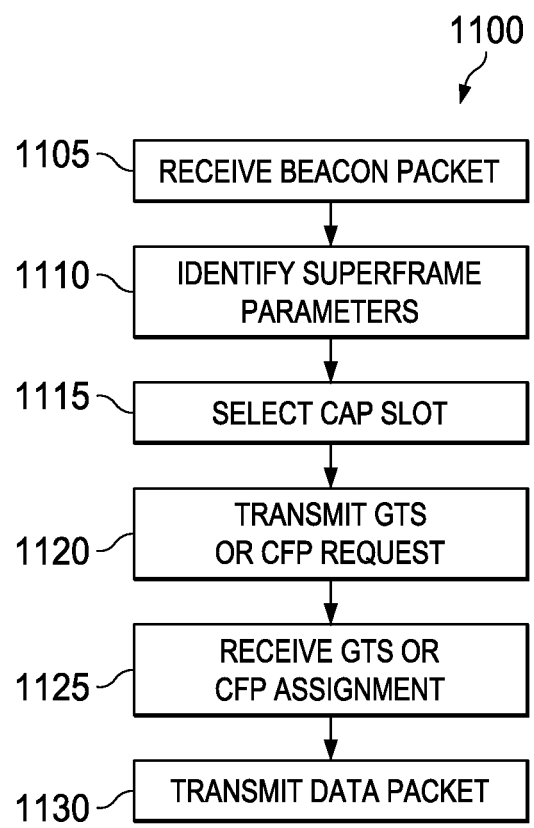

FIG. 11 is a flowchart of a third slotted channel access technique according to some embodiments.

Figure 12:
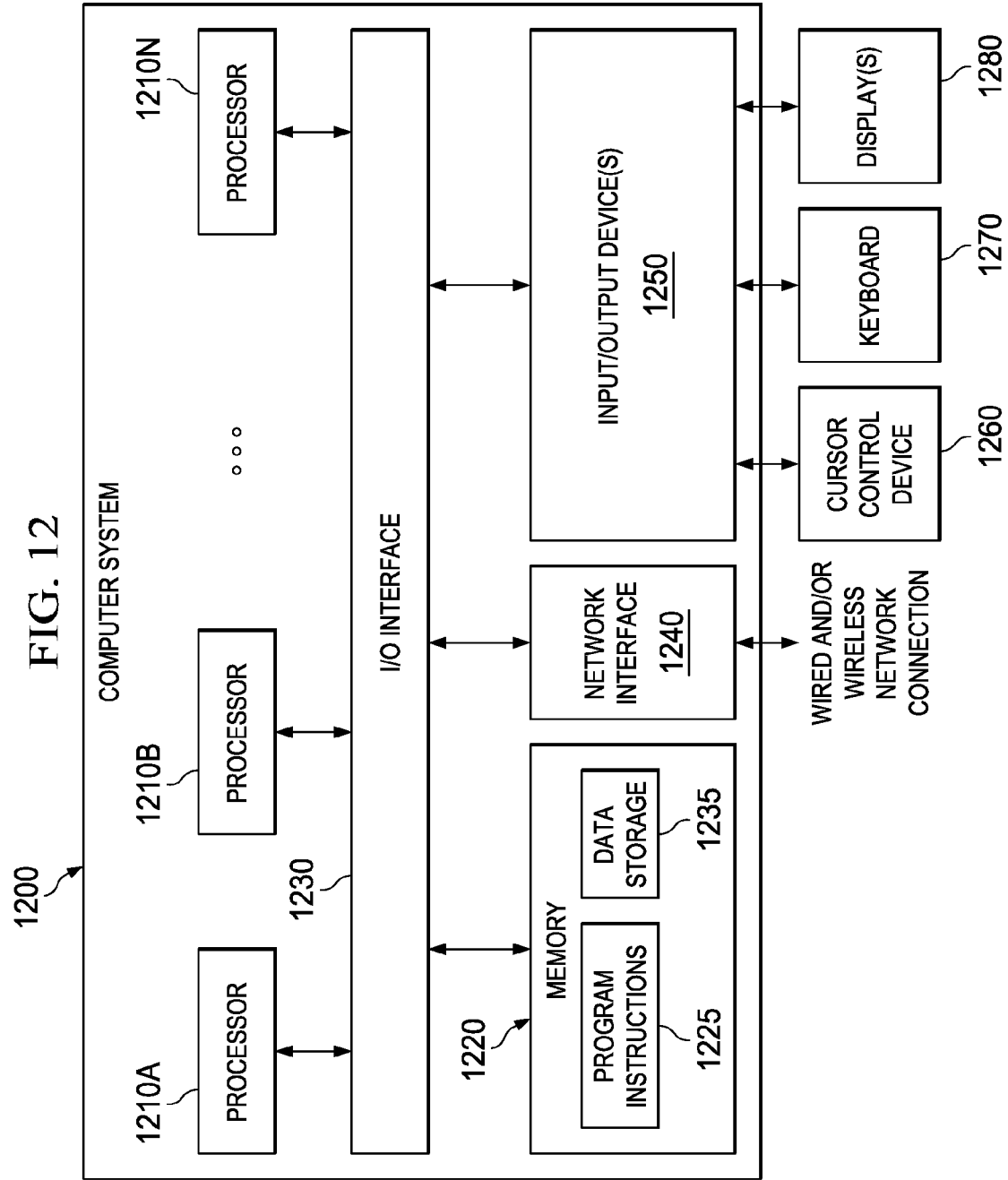

FIG. 12 is a block diagram of a computing system configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to design and/or implement slotted channel access techniques in network communications. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112*n* (e.g., street lighting, etc.).

PLC engine 202 may be configured to transmit and/or receive PLC signals over wires 108*a* and/or 108*b* via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108*a*, and/or 108*b*. PLC engine 202 may receive such power consumption information, encode it as one or more PLC signals, and transmit it over wires 108, 108*a*, and/or 108*b* to higher-level PLC devices (e.g., PLC gateways 112*n*, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

Turning to FIG. 7, a block diagram of a simplified PLC network is depicted according to some embodiments. For sake of illustration, network 700 includes PLC data concentrator 114 coupled to two transformers 104A and 104B. Transformer 104A is coupled to PLC devices 705 and 710, whereas transformer 104B is coupled to PLC device 715. In operation, PLC devices 705-715 may transmit and receive data from PLC data concentrator 114. When transmitting data, in order to avoid packet collision, each of PLC devices 705-715 may implement a channel access mechanism such as, for example, carrier sense multiple access (CSMA) or the like. For instance, prior to transmitting a data packet to PLC data concentrator 114, PLC device 705 may first probe the power line. If PLC device 705 senses that a transmission by PLC device 710 is already taking place, PLC device 705 may then "backoff" for a predetermined amount of time prior to attempting its own transmission.

During operation, however, transformers 104A and 104B may attenuate the PLC signals traversing the MV power lines. Although PLC devices 705 and 710 may be able to detect each other's transmissions through carrier sensing, signals transmitted by PLC devices 705 and 715 (as well as 710 and 715), signals may get attenuated twice due to transformers 104A and 104B, and therefore device 705 may not be able to sense device 715's ongoing transmissions and vice-versa (same for devices 710 and 715). As such, packet transmissions through the MV line in network 700 are ordinarily vulnerable to "hidden node" collisions during the entire period of frame transmission—i.e., collisions may take place if two devices begin transmitting at the same time and also if one device is already transmitting a packet, until such a transmission ends.

To address these, and other concerns, the PLC devices described above (and/or the computer system shown in FIG. 12) may be configured to implement one or more slotted channel access techniques through modifications to the network's MAC protocol. Generally speaking, a MAC protocol is a sub-layer of a data link layer specified in a seven-layer Open Systems Interconnection (OSI) model. Particularly, a MAC protocol may provide addressing and channel access control mechanisms that enable terminals or network nodes (e.g., PLC modems, etc.) to communicate over a shared medium (i.e., a power line). To facilitate communications among the devices described above, each device may implement a MAC protocol configured to coordinate inter-device communications according to a "superframe" structure. Such a superframe may define the duration and/or relative times for transmission and/or receipt of different types of information by each device.

FIG. 8 is a diagram of a superframe suitable for slotted channel access in PLC communications according to some embodiments. As shown, superframe 800 includes beacon time slot 805. During beacon slot 805, PLC data concentrator 114 may transmit one or more beacon packets to one or more of PLC devices 705-715 (i.e., in a downlink direction). Moreover, each beacon packet may include information that identifies the particular beacon slot over which it was sent and/or it may indicate the length, position, and/or duration of other elements (e.g., other beacon slots, CAP, CAP slots, GTS, etc.) in superframe 800. Accordingly, in some embodiments, once a listening PLC device receives a given beacon packet, the structure and/or timing of superframe 800 may be readily acquired or derived.

After beacon slots 805, superframe 800 may allocate a contention access period (CAP) 810 to allow one or more PLC devices 705-715 to transmit packets to PLC data concentrator 114 (i.e., in an uplink direction). In a general case, any PLC device 705-715 may be allowed to transmit packets to PLC data concentrator 114 during CAP 810. In some embodiments, two or more CAPs 810 may be provided. Guaranteed time slot (GTS) or contention free period (CFP) 815 may follow CAP 810 in superframe 800. During GTS 815, PLC data concentrator 114 may allocate different time periods to specific ones of PLC devices 705-715 for uplink and/or downlink communications without the risk of collision and/or contention for the medium.

As illustrated, CAP 810 may itself include a plurality of slots 820. In some implementations, each of slots 820 may have an equal, predetermined duration or length. Additionally or alternatively, slots 820 may have varying durations or lengths. For example, a first set of slots 820 may have a first duration and a second set of slots 820 may have a second duration, the second duration longer or shorter than the first duration. In this manner, PLC devices 705-715 intending to contend in a given channel may choose one of slots 820 in which to transmit a packet to PLC data concentrator 114. Collision may still happen, for example, if two different nodes select the same one of slots 820. However, if only one node chooses a particular one of slots 820, then it may have its transmission free from collisions during the entire transmission time, for example, from any transmissions from hidden nodes.

In embodiments where two or more CAPs 810 are provided, each CAP may include a plurality of slots. For example a first CAP may include a first set of slots, and a second CAP immediately following the first CAP in superframe 800 (thus preceding GTS 815) may include a second set of slots. Further, each slot in the first set of slots may have a duration different from the duration of each slot in the second set of slots. For example, if the first CAP 810 is longer than the second CAP, the duration of each slot in the first set may also be longer than the duration of slots in the second set. Additionally or alternatively, if the first CAP 810 corresponds to an uplink frequency subband that is wider than the uplink frequency subband of the second CAP, the duration of each slot in the first set may also be longer than the duration of slots in the second set.

In a first mode of operation, the duration of slots 820 may be equal (or proportional) to the longest packet transmission time prescribed by a given PLC protocol or standard. For sake of illustration only, if the CAP 810's duration is 4 seconds and the maximum packet transmission time is 100 ms, then CAP 810 may include 40 slots 820 of 100 ms each. This mode of operation is described below with respect to FIG. 9. As the longest allowed transmission time increases, however, the maximum achievable data rates and/or the efficiency of the network may be negatively affected. Accordingly, in a second mode of operation described in connection with FIG. 10, the duration of slots 820 may be equal (or proportional) to a sum of the durations of a request-to-send packet, an interframe space, and a clear-to-send packet, as prescribed by the PLC standard or protocol. For instance, if the CAP 810's duration is 4 seconds and the sum of durations of the request-to-send packet, interframe space, and clear-to-send packet is 10 ms, then CAP 810 may include 400 slots 820 of 10 ms each. In yet a third mode of operation, the duration of slots 820 may be equal (or proportional) to that of a GTS or CFP request packet. Such a technique is shown in FIG. 11. Because GTS or CFP request packets are small and of known size, in some cases, the efficiency of the network may be less affected when compared to the first and second modes of operation. Again, if the CAP 810's duration is 4 seconds and the duration of the GTS or CFP request packet is 5 ms, then CAP 810 may include 800 slots 820 of 5 ms each.

Typically, the larger the duration of slots 820, the more it is probable to directly transmit data alone without the need for additional control frames. However, data throughput is reduced when such slots are not used for transmissions. Therefore, in some embodiments, a computer-based operation or simulation may be performed to determine, for a particular network implementation, whether the first, second, or third modes of operations present a suitable tradeoff between packet collisions and data rates. In some cases, two or more of the first, second, or third modes of operation may be combined in the same superframe. For example, where two or more CAPs 810 are provided, a first CAP may employ the first mode of operation, a second CAP following the first CAP may employ the second mode of operation (or vice-versa) and/or a third CAP following the second CAP may employ the third mode of operation (or vice versa), each CAP thus having slots 820 of different durations. Furthermore, a MAC protocol may prescribe that a first superframe 800 have CAP 810 following one of the first, second or third modes of operation, and that a second superframe following the first superframe have a second CAP under a different mode of operation (and therefore the duration of sub-slots within the first CAP may be different from the duration of sub-slots within the second CAP).

FIG. 9 is a flowchart of a first slotted channel access technique. In some embodiments, method 900 may be performed, at least in part, by one or more of the various PLC devices (e.g., device 705-715, etc.) described above. As illustrated, at block 905, method 900 may include receiving a beacon packet, for example during beacon slot 805 of superframe 800. At block 910, method 900 may include identifying superframe parameters based upon the beacon packet, such as, for example, the length, position, and/or duration of other elements (e.g., other beacon slots, CAP, CAP slots, GTS, etc.) in superframe 800. In some embodiments, the beacon packet may indicate the number of slots 820 within CAP 810 and/or their lengths or durations. Additionally or alternatively, the beacon packet may also indicate whether superframe 800 is operating under the first, second, or third modes of operation. In this example, it is assumed that the first mode of operation is in force, and therefore each slot 820 has its duration equal (or proportional) to the maximum packet transmission time allowed by the protocol. Then, at block 915, method 900 may include selecting one of slots 820 previously identified. In some embodiments, a slot 820 within CAP 810 may be randomly selected. In other embodiments, a round-robin algorithm or the like may facilitate the selection. Then, at block 920, method 900 may include transmitting a data packet (e.g., to PLC concentrator 114) during the selected slot 820.

FIG. 10 is a flowchart of a second slotted channel access technique. In some embodiments, method 1000 may be performed, at least in part, by one or more of the various PLC devices (e.g., device 705-715, etc.) described above. As illustrated, blocks 1005-1015 are similar to blocks 905-915 of FIG. 9. In this embodiment, however, it is assumed that the second mode of operation is being employed, and therefore each slot 820 has its duration equal (or proportional) to a sum of the durations of a request-to-send packet, an interframe space, and a clear-to-send packet, as prescribed by the PLC standard or protocol. Therefore, at block 1020, method 1000 may include transmitting a request-to-send packet (e.g., to PLC concentrator 114) during the selected slot 820. At block 1025, method 1000 may include receiving a clear-to-send packet (e.g., from PLC concentrator 114). In some cases, the clear-to-send packet may be received during the same selected slot 820, for example, after the interframe space. Moreover, the clear-to-send packet may include instructions that the PLC device may use to transmit a data packet (e.g., immediately or at a future time), which it may do at block 1030. When other PLC devices receive the same clear-to-send packet, they may set their respective network allocation vectors (NAVs) to the same time to avoid accessing the channel during the packet transmission time. These other nodes may then resume normal operations at the end of the transmission time specified by the clear-to-send packet.

FIG. 11 is a flowchart of a third slotted channel access technique. Again, method 1100 may be performed, at least in part, by one or more of the various PLC devices (e.g., device 705-715, etc.) described above; and blocks 1105-1115 may be similar to blocks 905-915 of FIG. 9. In this embodiment, it is assumed that the third mode of operation is being employed, and therefore each slot 820 has its duration equal (or proportional) to that of a GTS or CFP request packet, as prescribed by the PLC standard or protocol. Accordingly, at block 1120, method 1100 may include transmitting a GTS or CFP request packet (e.g., to PLC concentrator 114). At block 1125 method 1100 may include receiving (e.g., from PLC concentrator 114) an allocation of a slot in GTS 815 for uplink transmissions of data packets. Because GTS slots are contention free, data packet transmission during this time generally do not suffer from hidden node collisions.

As noted above, in certain embodiments, systems and methods for designing, using, and/or implementing slotted channel access techniques in network communications may be executed, at least in part, by one or more communication devices and/or computer systems. One such computer system is illustrated in FIG. 12. In various embodiments, system 1200 may be implemented as a communication device, modem, data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1200 includes one or more processors 1210 coupled to a system memory 1220 via an input/output (I/O) interface 1230. Computer system 160 further includes a network interface 1240 coupled to I/O interface 1230, and one or more input/output devices 1225, such as cursor control device 1260, keyboard 1270, display(s) 1280, and/or mobile device 1290. In various embodiments, computer system 1200 may be a single-processor system including one processor 1210, or a multi-processor system including two or more processors 1210 (e.g., two, four, eight, or another suitable number). Processors 1210 may be any processor capable of executing program instructions. For example, in various embodiments, processors 1210 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1210 may commonly, but not necessarily, implement the same ISA. Also, in some embodiments, at least one processor 1210 may be a graphics processing unit (GPU) or other dedicated graphics-rendering device.

System memory 1220 may be configured to store program instructions and/or data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1220 as program instructions 1225 and data storage 1235, respectively. In other embodiments, program instructions and/or data may be received, sent or stored upon different types of computer-accessible media or on similar media separate from system memory 1220 or computer system 1200. Generally speaking, a computer-accessible medium may include any tangible storage media or memory media such as magnetic or optical media—e.g., disk or CD/DVD-ROM coupled to computer system 1200 via I/O interface 1230. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1240.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. In addition, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, or between nodes of computer system 1200. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, mobile devices, or any other devices suitable for entering or retrieving data by one or more computer system 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1225, configured to implement certain embodiments described herein, and data storage 1235, comprising various data accessible by program instructions 1225. In an embodiment, program instructions 1225 may include software elements of embodiments illustrated in the above figures. For example, program instructions 1225 may be implemented in various embodiments using any desired programming language, scripting language, or combination of programming languages and/or scripting languages (e.g., C, C++, C#, JAVA®, JAVASCRIPT®, PERL®, etc.). Data storage 1235 may include data that may be used in these embodiments (e.g., recorded communications, profiles for different modes of operations, etc.). In other embodiments, other or different software elements and data may be included.

A person of ordinary skill in the art will appreciate that computer system 1200 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
performing, by a first communication device,
selecting one of a plurality of time slots within a contention access period (CAP), each of the plurality of time slots having a predetermined duration, wherein the CAP follows a superframe structure prescribed by a communication protocol or standard, and wherein the predetermined duration corresponds to a maximum packet transmission time supported or prescribed by the communication protocol or standard; and transmitting a packet during the selected time slot.

2. The method of claim 1, wherein selecting the one of a plurality of time slots includes randomly selecting the one of a plurality of time slots.

3. The method of claim 1, wherein selecting the one of a plurality of time slots includes using a round-robin algorithm.

4. The method of claim 1, wherein the packet is a data packet.

5. A method comprising:

performing, by a first communication device, selecting one of a plurality of time slots within a contention access period (CAP), each of the plurality of time slots having a predetermined duration, wherein the CAP follows a superframe structure prescribed by a communication protocol or standard, and wherein the predetermined duration corresponds to the sum of durations of: a request-to-send packet, an interframe space, and a clear-to-send packet prescribed by the communication protocol or standard; and transmitting a packet during the selected time slot.

6. The method of claim 5, wherein transmitting the packet includes transmitting a request-to-send packet to a second communication device.

7. The method of claim 6, further comprising:

performing, by the first communication device, receiving a clear-to-send packet from the second communication device during the selected time slot, the clear-to-send packet indicating an assigned data packet transmission time; and transmitting a data packet to the second communication device for the assigned data packet transmission time.

8. The method of claim 7, wherein the communication device is a power line communication PLC device and the other communication device is a PLC data concentrator.

9. The method of claim 5, wherein selecting the one of a plurality of time slots includes randomly selecting the one of a plurality of time slots.

10. The method of claim 5, wherein selecting the one of a plurality of time slots includes using a round-robin algorithm.

11. A method comprising:

performing, by a first communication device, selecting one of a plurality of time slots within a contention access period (CAP), each of the plurality of time slots having a predetermined duration, wherein the CAP follows a superframe structure prescribed by a communication protocol or standard, and wherein the predetermined duration corresponds to a duration of a guaranteed time slot (GTS) or contention free period (CFP) request packet prescribed by the communication protocol or standard; and transmitting a packet during the selected time slot.

12. The method of claim 11, further comprising:

performing, by the first communication device, transmitting a GTS or CFP request packet to a second communication device;

receiving a GTS or CFP assignment from the second communication device; and transmitting a data packet to the second communication device during the GTS or CFP assignment.

13. The method of claim 12, wherein selecting the one of a plurality of time slots includes randomly selecting the one of a plurality of time slots.

14. The method of claim 12, wherein selecting the one of a plurality of time slots includes using a round-robin algorithm.

15. A power line communication (PLC) modem comprising:

a processor; and a memory coupled to the processor, the memory configured to store program instructions executable by the processor to cause the PLC modem to:

select one of a plurality of time slots within a contention access period (CAP) of a superframe structure prescribed by a PLC protocol or standard, each of the plurality of time slots having a predetermined duration, wherein the predetermined duration corresponds to a duration of a data packet of maximum size prescribed by the PLC protocol or standard, and wherein the packet is a data packet; and transmit a packet during the selected time slot.

16. The PLC modem of claim 15, wherein the processor includes a digital signal processor (DSP), an application specific integrated circuit (ASIC), a system-on-chip (SoC) circuit, a field-programmable gate array (FPGA), a microprocessor, or a microcontroller.

17. A power line communication (PLC) modem comprising:

a processor; and a memory coupled to the processor, the memory configured to store program instructions executable by the processor to cause the PLC modem to:

select one of a plurality of time slots within a contention access period (CAP) of a superframe structure prescribed by a PLC protocol or standard, each of the plurality of time slots having a predetermined duration, wherein the predetermined duration corresponds to the sum of durations of: a request-to-send packet, an interframe space, and a clear-to-send packet prescribed by the PLC protocol or standard, and wherein the packet is a request-to-send packet; and transmit a packet during the selected time slot.

18. The PLC modem of claim 17, wherein the processor includes a digital signal processor (DSP), an application specific integrated circuit (ASIC), a system-on-chip (SoC) circuit, a field-programmable gate array (FPGA), a microprocessor, or a microcontroller.

19. A power line communication (PLC) modem comprising:

a processor; and a memory coupled to the processor, the memory configured to store program instructions executable by the processor to cause the PLC modem to:

select one of a plurality of time slots within a contention access period (CAP) of a superframe structure prescribed by a PLC protocol or standard, each of the plurality of time slots having a predetermined duration, wherein the predetermined duration corresponds to a duration of a guaranteed time slot (GTS) or contention free period (CFP) request packet prescribed by the PLC protocol or standard, and wherein the packet is a GTS or CFP request packet; and transmit a packet during the selected time slot.

20. The PLC modem of claim 19, wherein the processor includes a digital signal processor (DSP), an application specific integrated circuit (ASIC), a system-on-chip (SoC) circuit, a field-programmable gate array (FPGA), a microprocessor, or a microcontroller.

21. An electronic non-transitory storage medium having program instructions stored thereon that, upon execution by a processor within a power line communication (PLC) device, cause the PLC device to:

select one of a plurality of time slots within a contention access period (CAP) prescribed by a PLC protocol or standard, each of the plurality of time slots having a predetermined duration, wherein the predetermined duration corresponds to a duration of a data packet of maximum size prescribed by the PLC protocol or standard, and wherein the packet is a data packet; and transmit a packet during the selected time slot.

22. An electronic non-transitory storage medium having program instructions stored thereon that, upon execution by a processor within a power line communication (PLC) device, cause the PLC device to:

select one of a plurality of time slots within a contention access period (CAP) prescribed by a PLC protocol or standard, each of the plurality of time slots having a predetermined duration, wherein the predetermined duration corresponds to the sum of durations of: a request-to-send packet, an interframe space, and a clear-to-send packet prescribed by the PLC protocol or standard, and wherein the packet is a request-to-send packet; and transmit a packet during the selected time slot.

23. An electronic non-transitory storage medium having program instructions stored thereon that, upon execution by a processor within a power line communication (PLC) device, cause the PLC device to:

select one of a plurality of time slots within a contention access period (CAP) prescribed by a PLC protocol or standard, each of the plurality of time slots having a predetermined duration, wherein the predetermined duration corresponds to a duration of a guaranteed time slot (GTS) or contention free period (CFP) request packet prescribed by the PLC protocol or standard, and wherein the packet is a GTS or CFP request packet; and transmit a packet during the selected time slot.

* * * * *